United States Patent

Firestone

[15] 3,678,078

[45] July 18, 1972

[54] METHOD FOR THE PREPARATION OF (CIS-1,2-EPOXYPROPYL) PHOSPHONIC ACID PRODUCTS

[72] Inventor: Raymond A. Firestone, Fanwood, N.J.

[73] Assignee: Merck & Co., Inc., Rahway, N.J.

[22] Filed: Jan. 29, 1969

[21] Appl. No.: 795,042

[52] U.S. Cl. ..........................260/348 R, 260/946, 424/203
[51] Int. Cl..........................................C07f 9/40, C07f 9/42
[58] Field of Search......................................260/348, 348 R

[56] References Cited

OTHER PUBLICATIONS

Churi, R. H. et al., Jour. Am. Chem. Soc. 88 (8), April 20, 1966, pp. 1824– 1825.

Primary Examiner—Norma S. Milestone
Attorney—Joseph W. Molasky, J. Jerome Behan and I. Louis Wolk

[57] ABSTRACT

A method for the preparation of (cis-1,2-epoxypropyl)-phosphonic dihalide and esters of (cis-1,2-epoxypropyl)-phosphonic acid, which comprises treating 2-hydroxypropionaldehyde with phosphorous trihalide or an ester of phosphorohalidous acid to afford, respectively, (1-formylethyl)-phosphorodihalidite or (1-formylethyl)phosphite, followed by the rearrangement of the said intermediates to yield (cis-1,2-epoxypropyl)phosphonic dihalide or (cis-1,2-epoxypropyl)phosphonate. The dihalide and esterified products thus obtained have utility as intermediates inasmuch as they may be converted by conventional means to (cis-1,2-epoxypropyl)phosphonic acid or to the salts thereof, which products are antibiotics useful in inhibiting the growth of gram-negative and gram-positive pathogenic bacteria.

9 Claims, No Drawings

METHOD FOR THE PREPARATION OF (CIS-1,2-EPOXYPROPYL) PHOSPHONIC ACID PRODUCTS

This invention relates to a novel method for the preparation of the dihalide and ester derivatives of (cis-1,2-epoxypropyl)phosphonic acid, which products have utility as intermediates in the preparation of (cis-1,2-epoxypropyl)phosphonic acid and its corresponding salts.

The said (±) and (−) (cis-1,2-epoxypropyl)phos-phonic acid derivative and its salts are antimicrobial agents, which are useful in inhibiting the growth of gram-positive and gram-negative pathogenic bacteria. The (−) form of (cis-1,2-epoxypropyl)phosphonic acid and particularly its sodium and calcium salts, are active against Bacillus, Escherichia, Staphylococci, Salmonella and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, (±) and (−) (cis-1,2-epoxypropyl)-phosphonic acid and the salts thereof can be used as antiseptic agents to remove susceptible organisms from pharmaceutical, dental and medical equipment and can also be used in other areas subject to infection by such organisms. Similarly, they can be used to separate certain microorganisms from mixtures of microorganisms. The salts of (−) (cis-1,2-epoxypropyl)phosphonic acid are particularly valuable because not only do they have application in the treatment of diseases caused by bacterial infections in man and animals but they are active against resistant strains of pathogens. The said salts constitute a preferred embodiment of this invention because they are effective when given orally, although it is to be noted that they can also be administered parenterally.

In accordance with this invention (cis-1,2-epoxypropyl)phosphonic dihalide and the salts and ester derivatives of (cis-1,2-epoxypropyl)phosphonic acid (I, infra) are obtained via the reaction of 2-hydroxypropionaldehyde with phosphorous trihalide or with an ester of phosphorohalidous acid, i.e., a phosphorohalidite, in the presence of a base, followed by the rearrangement of the (1-formylethyl)phosphorodihalidite or (1-formylethyl)phosphite (II, infra) thus obtained to afford the desired product. In general, it is only necessary to bring the reactants into intimate contact with one another. However, in practice it is usually desirable to conduct the reaction of the 2-hydroxypropionaldehyde and phosphorous trihalide or ester of phosphorohalidous acid in a suitable solvent such as benzene, cyclohexane or chlorobenzene and the like at temperatures below room temperature as, for example, at temperatures in the range of from about −10° C. up to about 20° C., whereafter the base is removed from the reaction mixture in the form of its salt; and the (1-formylethyl)phosphorodihalidite or (1-formylethyl)phosphite intermediate (II) thus obtained is then taken up in a suitable solvent such as dimethylformamide or diglyme and subjected to rearrangement. The rearrangement may be effected simply by heating the reaction mixture at its reflux temperature, usually over an extended period of from about 1 to about 5 hours but, in general, temperatures in the range of from about 100° C. to about 150° C. are considered suitable. The following equation illustrates the process of this invention:

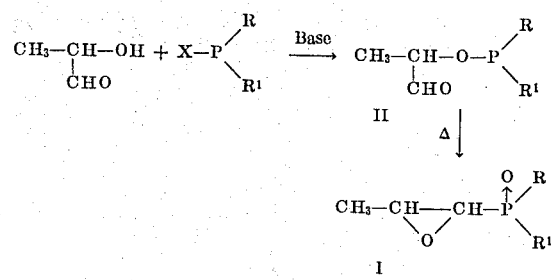

wherein R and R¹ are the same or different moieties selected from halo, for example, chloro, bromo, fluoro and the like, or alkoxy, for example, lower alkoxy such as methoxy, ethoxy, n-propoxy and the like, aryloxy, for example, mononuclear aryloxy such as phenoxy and the like or aralkoxy, for example, mononuclear aralkoxy, for example, benzyloxy and the like and X is halogen, for example, chloro, bromo, fluoro or iodo. Suitable bases which may be employed in the reaction of 2-hydroxypropionaldehyde with the phosphorous trichloride or phosphorohalidite reactants include, for example, tertiary hydrocarbyl amines such as tri-lower alkyl-amines as illustrated by trimethyl amine, triethyl amine and the like, or N-alkyl substituted heterocyclic amines, for example, N-lower alkyl substituted heterocyclic amines such as N-methyl pyrrolidine, N-methyl piperidine, N-methyl morpholine or pyridine and the like or N,N-dialkylaniline, for example, N,N-di-lower alkylaniline such as N,N-dimethylaniline and the like. The esters and dihalides of (cis-1,2-epoxypropyl)phosphonic acid obtained according to this process may then be isolated and purified or, if desired, the said esters or amides may be converted to the corresponding free acid and to the salts thereof by conventional means.

In effecting the conversion of the instant (cis-1,2-epoxypropyl)phosphonic dihalide products to (cis-1,2-epoxypropyl)phosphonic acid or its salts, it is only necessary to treat the former with a suitable hydrolyzing agent as, for example, with water or with an aqueous solution of an organic or inorganic acid or base. However, alkaline hydrolysis is particularly suitable inasmuch as it not only affords a method for the preparation of the pharmacologically active salts of (cis-1,2-epoxypropyl)phosphonic acid but, from a preparative standpoint, also serves to neutralize the hydrogen halide which is liberated during the reaction and which, under normal operating conditions, tends to attach the epoxide ring. Suitable alkaline reagents include, for example, alkali and alkaline earth metal hydroxides, carbonates, bicarbonates and alkoxides or suitable monoalkylamines and dialkylamines such as calcium oxide, calcium hydroxide, sodium hydroxide, potassium hydroxide, sodium bicarbonate, ammonium hydroxide, barium hydroxide, sodium carbonate, benzylamine, ethylamine, phenethylamine and the like.

The method by which the ester products of this invention may be converted to (cis-1,2-epoxypropyl)-phosphonic acid and the salts thereof include hydrolytic means such as comprises treating the said esters with an aqueous solution of an acid such as hydrochloric acid or sulfuric acid under carefully buffered conditions or with an aqueous solution of a base such as an aqueous solution of an alkali metal or alkaline earth metal carbonate, bicarbonate, oxide or hydroxide or, alternatively, by treatment with trimethylchlorosilane followed by aqueous hydrolysis; or by hydrogenolysis; or via the application of suitable reductive, displacement or oxidative means; or by treatment of the said esters with a photochemical agent. The choice of a suitable method for the conversion of the said esters to (cis-1,2-epoxypropyl)phosphonic acid or its salts depends to a large extent upon the character of the ester moiety comprising the phosphonate portion of the molecule. For example, when the ester is a dimethyl ester, the conversion to (cis-1,2-epoxypropyl)phosphonic acid is most advantageously conducted by treating the said ester with trimethylchlorosilane followed by aqueous hydrolysis of the silane ester intermediate thus obtained to the free acid. The methyl silane ester interchange is accomplished by refluxing the silane compounds, such as trimethylchlorosilane, with the methyl ester in an inorganic solvent such as hexane, benzene and the like. In addition to the foregoing, the alkyl esters of (cis-1,2-epoxypropyl)phosphonic acid and the aryl analogs thereof, including esters of mixed function such as (cis-1,2-epoxypropyl)phosphonate wherein one ester moiety is derived from an alkanol and the remaining ester moiety is derived from phenol and the like, may be converted to the free acid by alkaline hydrolysis. However, in view of the high degree of stability of the dialkyl esters it is not uncommon to find that the treatment of a dialkyl (cis-1,2-epoxypropyl)phosphonate with an aqueous solution of a base usually affords the monoalkyl ester intermediate and, therefore, the ultimate conversion of the alkyl diester to the salt or free acid necessitates a second step, such as treatment with a photochemical agent or with an acidic reagent in order to effect the removal of the remaining alkyl ester moiety.

The nuclear carbons comprising the epoxide ring in the instant products are asymmetric in character and, therefore, the said products may be obtained in the form of one or more of four optically active isomers. In this connection it should be noted that (−) (cis-1,2-epoxypropyl)phosphonic acid and its salts are particularly effective in inhibiting the growth of pathogenic bacteria and, therefore, the preparation of that isomer constitutes a preferred embodiment of this invention.

The said (−) (cis-1,2-epoxypropyl)phosphonic acid and its salts rotate plane-polarized light in a counter-clockwise direction (to the left as viewed by the observer) when the rotation of its disodium salt is measured in water (5 percent concentration) at 405 m$\mu$.

The designation cis used in describing the 1,2-epoxypropylphosphonic acid compounds means that each of the hydrogen atoms attached to carbon atoms 1 and 2 of the propylphosphonic acid are on the same side of the oxide ring.

The following examples illustrate the method by which (cis-1,2-epoxypropyl)phosphonic acid and its salts and ester derivatives (I) may be obtained. However, the examples are illustrative only and should not be construed as being limited thereto since other equivalent reagents may be substituted therefor to yield an identical (cis-1,2-epoxypropyl)phosphonic acid and its salt and ester derivatives. In this connection it should be noted that the instant process is intended to include all other functionally equivalent methods of preparation. Therefore, any modification of this synthesis which results in the formation of an identical product should be construed as constituting an analgous method. The claimed process is capable of wide variation and modification and, therefore, any minor departure therefrom or extension thereof is considered as being within the skill of the artisan and as falling within the scope of this invention.

EXAMPLE 1

Dimethyl Ester of (Cis-1,2-epoxypropyl)phosphonic Acid

To a solution of racemic 2-hydroxypropionaldehyde (10.0 g.) in benzene (100 ml.) is added one equivalent of triethylamine. Then over a 30 minute period, one equivalent of the dimethyl ester of phosphorochlorodous acid is added to the mixture with stirring at 0° C. Triethylamine hydrochloride is filtered off, dimethyl formamide (100 ml.) is added and the benzene is distilled off at atmospheric pressure until the boiling point reaches that of dimethylformamide. The (1-formylethyl)-dimethylphosphite thus obtained is then refluxed for 1 hour to effect a rearrangement to the dimethyl ester of (cis-1,2-epoxypropyl)phosphonic acid and the said ester is then vacuum distilled to remove dimethylformamide. The residue is identified as the racemic dimethyl ester of (cis-1,2-epoxyporpyl)phosphonic acid.

EXAMPLE 2

(Cis-1,2-epoxypropyl)phosphonic Dichloride

Racemic 2-hydroxypropionaldehyde (1.0 g.) and an equivalent amount of triethylamine in benzene (20 ml.) are added slowly with vigorous stirring to a solution of two equivalents of phosphorous trichloride in benzene (100 ml.) maintained at 0° C. Triethylamine hydrochloride is removed by filtration and excess phosphorous trichloride is distilled off under vacuum. The residue of (1-formylethyl)phosphorodichloridite is taken up as a 1 percent solution in diglyme and subjected to rearrangement by refluxing for 1 hour. The mixture of racemic (cis-1,2-epoxypropyl)phosphonic dichloride thus obtained is then subjected to evaporation in vacuo and the residue is treated with ice to afford racemic (cis-1,2-epoxypropyl)-phosphonic dichloride.

By substituting phosphorous tribromide and phosphorous triiodide for the phosphorous trichloride recited in Example 2 and otherwise following the procedure described therein, the racemic products (cis-1,2-epoxypropyl)phosphonic dibromide and (cis-1,2-epoxypropyl)-phosphonic diiodide, respectively, are obtained.

EXAMPLE 3

1R:2S (Cis-1,2-epoxypropyl)phosphonic Dibromide

By substituting optically active R-2-hydroxypropionaldehyde and phosphorous tribromide for the racemic 2-hydroxypropionaldehyde and phosphorous trichloride recited in Example 2 and following the procedure described therein, there is thus obtained optically active 1R:2S (cis-1,2-epoxypropyl)phosphonic dibromide.

EXAMPLE 4

Diphenyl Ester of (Cis-1,2-epoxypropyl)phosphonic Acid

Racemic 2-hydroxypropionaldehyde (5.0 g.) in chlorobenzene (50 ml.) is added to two equivalents of pyridine. One equivalent of the diphenyl ester of phosphorobromidous acid is then added with stirring over a 20 minute period at 10° C. There is thus obtained a residue identified as (1-formylethyl)diphenyl phosphite which, when taken up in dimethylformamide and refluxed for 2 hours results in a rearrangement to afford the diphenyl ester of racemic (cis-1,2-epoxypropyl)phosphonic acid.

EXAMPLE 5

Dibenzyl Ester of (Cis-1,2-epoxypropyl)phosphonic Acid

By substituting an equivalent amount of the dibenzyl ester of phosphorobromidous acid for the dimethyl ester of phosphorochlorodous acid recited in Example 1 and otherwise following the procedure described therein, the racemic dibenzyl ester of (cis-1,2-epoxypropyl)phosphonic acid is obtained.

The racemic and optically active (cis-1,2-epoxypropyl)phosphonic dihalides prepared according to this invention are conveniently converted to racemic and optically active (cis-1,2-epoxypropyl)phosphonic acid and to the salts thereof via the application of hydrolytic means. The following procedure illustrates such a method of preparation:

Racemic (cis-1,2-epoxypropyl)phosphonic dichloride (0.1 mole) is added over 1 hour dropwise, with stirring, to cold water (100 ml.) at 0°-2° C. and the pH of the solution is adjusted at once to 8.2 by the addition of dilute sodium hydroxide. An aqueous solution of calcium acetate monehydrate (0.1 mole) is then added and, after stirring for 1 hour while maintaining the solution at a pH of 8.2, the racemic calcium salt of (cis-1,2-epoxypropyl)phosphonic acid precipitates and is filtered and dried. The product thus obtained is an effective antimicrobial which inhibits the growth of pathogenic bacteria as, for example, the Bacillus, Escherichia, Staphylococci, Salmonella and Proteus pathogens.

In a manner similar to that described above for the preparation of the racemic calcium salt of (cis-1,2-epoxypropyl)phosphonic acid, other optically active salts of (cis-1,2-epoxypropyl)phosphonic acid may be obtained simply by substituting the appropriate optically active (cis-1,2-epoxypropyl)-phosphonic dihalide starting material for the racemic (cis-1,2-epoxypropyl)phosphonic dichloride described therein. Thus, for example, by substituting optically active 1R:2S (cis-1,2-epoxypropyl)phosphonic dibromide for the racemic (cis-1,2-epoxypropyl)phosphonic dichloride recited in the preceding paragraph and following the procedure described therein, the (−) calcium salt of (cis-1,2-epoxypropyl)phosphonic acid is obtained. The optically active product thus obtained is particularly effective as an antimicrobial in inhibiting the growth of pathogenic bacteria.

The (cis-1,2-epoxypropyl)phosphonic acid esters obtained via the instant process may also be converted to the pharmacologically active salts and corresponding free acid by conventional means. As one illustration of this conversion the following is typical:

Racemic dimethyl ester of (cis-1,2-epoxypropyl)phosphonic acid (1 m. mole) is trimethylchlorosilane (10 cc.) is refluxed for 8 hours and the reaction mixture is extracted with water to yield an aqueous solution of (cis-1,2-epoxypropyl)phosphonic acid. The product thus obtained is then treated with two equivalents of sodium hydroxide and the solution evaporated to yield the disodium salt of (cis-1,2-epoxypropyl)phosphonic acid.

It will be apparent from the foregoing description that the disclosed method for the preparation of (cis-1,2-epoxypropyl)phosphonic dihalide and the salts and esters of (cis-1,2-epoxypropyl)phosphonic acid constitutes a valuable contribution to the art. The artisan will also appreciate that the process disclosed in the above examples is merely illustrative and is capable of wide variation and modification without departing from the spirit of this invention.

What is claimed is:

1. A method for the preparation of (cis-1,2-epoxypropyl)phosphonic dihalide and esters of (cis-1,2-epoxypropyl)phosphonic acid; which comprises treating 2-hydroxypropionaldehyde with either phosphorous trihalide or a dialkyl, diaryl or diaralkyl ester of phosphorohalidous acid at a temperature in the range of from about −10° C. to about 20° C. and in the presence of a tertiary-hydrocarbylamine; followed by the rearrangement of the corresponding (1-formylethyl)phosphorodihalidite or (1-formylethyl)phosphite intermediate thus obtained by heating at a temperature in the range of from about 100° C. to about 150° C.

2. A method according to claim 1 for the preparation of (cis-1,2-epoxypropyl)phosphonic dihalide which comprises treating 2-hydroxypropionaldehyde with a phosphorous trihalide, in the presence of a tertiary-hydrocarbylamine, followed by the rearrangement of the (1-formylethyl)phosphorodihalidite thus obtained by heating at a temperature in the range of from about 100° C. to about 150° C. to afford the desired product.

3. The method according to claim 2 wherein the phosphorous trihalide is phosphorous trichloride, phosphorous tribromide, or phosphorous triiodide.

4. The method according to claim 2 wherein 2-hydroxypropionaldehyde is treated with phosphorous trihalide in the presence of a trialkylamine, followed by the rearrangement of the (1-formylethyl)phosphorodihalidite intermediate thus obtained by heating at a temperature in the range of from about 100° C. to about 150° C. to afford the desired product.

5. The method according to claim 4 wherein the phosphorous trihalide employed is phosphorous trichloride.

6. A method according to claim 1 for the preparation of an ester of (cis-1,2-epoxypropyl)phosphonic acid; which comprises treating 2-hydroxypropionaldehyde with a dialkyl, diaryl or diaralkyl ester of phosphorohalidous acid, in the presence of a tertiary-hydrocarbylamine followed by the rearrangement of the (1-formylethyl)phosphite intermediate thus obtained by heating at a temperature in the range of from about 100° C. to about 150° C. to afford the desired product.

7. The method according to claim 6 wherein the tertiary-hydrocarbylamine is a tri-lower alkylamine.

8. A method according to claim 6 which comprises treating 2-hydroxypropionaldehyde with a di-lower alkyl ester of phosphorohalidous acid, in the presence of a tri-lower alkylamine, followed by the rearrangement of the (1-formylethyl)di-lower alkyl phosphite intermediate thus obtained to afford the di-lower alkyl ester of (cis-1,2-epoxypropyl)phosphonic acid.

9. The method according to claim 8 wherein the di-lower alkyl ester of phosphorohalidous acid is dimethyl phosphorochloridous acid and the resulting product is the dimethyl ester of (cis-1,2-epoxypropyl)phosphonic acid.

* * * * *